(12) United States Patent
Saffre

(10) Patent No.: US 7,739,741 B2
(45) Date of Patent: Jun. 15, 2010

(54) METHOD AND APPARATUS FOR NETWORK SECURITY

(75) Inventor: Fabrice T P Saffre, Kesgrave (GB)

(73) Assignee: British Telecommunications public limited company, London (GB)

( * ) Notice: Subject to any disclaimer, the term of this patent is extended or adjusted under 35 U.S.C. 154(b) by 1582 days.

(21) Appl. No.: 10/507,893

(22) PCT Filed: Mar. 25, 2003

(86) PCT No.: PCT/GB03/01276

§ 371 (c)(1),
(2), (4) Date: Sep. 17, 2004

(87) PCT Pub. No.: WO03/083626

PCT Pub. Date: Oct. 9, 2003

(65) Prior Publication Data

US 2005/0132166 A1    Jun. 16, 2005

(30) Foreign Application Priority Data

Mar. 28, 2002    (GB)    ................................. 0207402.9
May 27, 2002     (EP)    ................................. 02253696

(51) Int. Cl.
G06F 7/04      (2006.01)
H04L 29/06     (2006.01)
(52) U.S. Cl. ........................................ 726/26; 713/153
(58) Field of Classification Search .................. 726/26; 713/153
See application file for complete search history.

(56) References Cited

U.S. PATENT DOCUMENTS 5,659,617 A *   8/1997  Fischer ........................ 380/258
6,070,244 A *   5/2000  Orchier et al. ................. 726/1
6,640,241 B1*  10/2003  Ozzie et al. .................. 709/204
6,785,819 B1*   8/2004  Sakakura ...................... 726/6
6,854,059 B2*   2/2005  Gardner ....................... 713/171
RE38,899 E  *  11/2005  Fischer ........................ 380/258
7,024,552 B1*   4/2006  Caswell et al. ............... 713/155
2001/0037311 A1* 11/2001  McCoy et al. ................. 705/65
2002/0124188 A1*  9/2002  Sherman et al. ............. 713/201

(Continued)

FOREIGN PATENT DOCUMENTS

EP    0999490 A2    5/2000

(Continued)

OTHER PUBLICATIONS

Djordjevic et al., "Certificate-Based Distributed Firewalls for Secure E-Commerce Transactions", Journal of the Institution of British Telecommunications Engineers, British Telecommunications Engineering, London, GB, vol. 2, No. 3, Jul. 2001, pp. 14-19, , XP001107572.

(Continued)

Primary Examiner—Techane J Gergiso
(74) Attorney, Agent, or Firm—Nixon & Vanderhye P.C.

(57) ABSTRACT

A method and apparatus are disclosed which incorporate a system for enabling the adaptive modification of the security level of a node in a network based on software use of nodes in the network. The system is particularly applicable to dynamic network i.e. networks in which nodes may be mobile and in which the network topology is not constant.

18 Claims, 13 Drawing Sheets

U.S. PATENT DOCUMENTS

| | | | |
|---|---|---|---|
| 2002/0138471 A1* | 9/2002 | Dutta et al. | 707/3 |
| 2002/0138744 A1* | 9/2002 | Schleicher et al. | 713/187 |
| 2003/0009660 A1* | 1/2003 | Walker | 713/153 |
| 2003/0009689 A1* | 1/2003 | Kolb | 713/201 |
| 2003/0061363 A1* | 3/2003 | Bahl et al. | 709/229 |
| 2003/0163697 A1* | 8/2003 | Pabla et al. | 713/171 |
| 2003/0174838 A1* | 9/2003 | Bremer | 380/270 |
| 2003/0217105 A1* | 11/2003 | Zircher et al. | 709/205 |
| 2003/0217289 A1* | 11/2003 | Ammon et al. | 713/201 |
| 2003/0233551 A1* | 12/2003 | Kouznetsov et al. | 713/175 |

FOREIGN PATENT DOCUMENTS

| | | |
|---|---|---|
| WO | WO 00/34867 | 6/2000 |
| WO | WO 01/71499 | 9/2001 |

OTHER PUBLICATIONS

Labuschagne et al., "The Use of Real-Time Risk Analysis to Enable Dynamic Activation of Countermeasures", Computers & Security. International Journal Devoted to the Study of Technical and Financial Aspects of Computer Security, Elsevier Science Publishers, Amsterdam, NL, vol. 17, No. 4, 1998, pp. 347-357, XP004129259.
International Search Report—Jun. 27, 2003.
International Search Report—Jul. 18, 2003.
European Search Report—Nov. 28, 2002.
European Search Report—Jan. 31, 2003.

* cited by examiner

METHOD AND APPARATUS FOR NETWORK SECURITY

This application is the U.S. national phase of international application PCT/GB03/01276 filed 25 Mar. 2003 which designated the U.S. and claims benefit of GB 0207402.9, dated 28 Mar. 2002 and EP 02253696.5, dated 27 May 2002, the entire content of which is hereby incorporated by reference.

TECHNICAL FIELD

The present invention relates to data and communications networks and in particular, but not exclusively, to the security of such networks. The invention is particularly applicable to the management of security in dynamic networks.

BACKGROUND

Current network security is based on the concept of fortification. Sensitive information/hardware is protected from the world outside the network by security software called a firewall that runs on a limited number of computers called gateways that provide the links between the network and other non-trusted networks and/or computers. Reaching within the protected network normally involves crossing one of these firewalls where identity controls are conducted and only legitimate access requests allowed.

This strategy is effective as long as there is no breach in the firewall and control at the gates is efficient. This security technique is well adapted to network architecture where data and communications are carried out over fixed physical wires and cables. In this kind of environment, security measures can effectively be implemented at the entry points to the network that cannot be avoided.

A drawback of this policy is that anything inside the walls is assumed to have successfully passed through a filtering procedure and is therefore implicitly trusted. So as soon as a hostile entity such as a hacker or virus has found a way to avoid all checkpoints it can access and damage anything that was supposed to be protected within the network. Such malevolent entry is often gained via an unsecured or compromised entry point commonly referred to as a back door. However, backdoors are relatively rare and/or difficult to find in well-protected systems. Therefore a hacker or virus needs to be relatively clever to be able to use them as a way of getting inside the secure network.

The efficiency of static firewalls is entirely dependent on 2 elements. The first is their ability to recognise intruders (which is why any anti-virus software has to be kept up-to-date). The second is the topological stability of the network they protect. In other words they are implemented where they are needed i.e. at interfaces with other networks and computers.

Network architecture, which is assumed to be fairly stable in the long term. In other words, the security manager knows where communications from the outside world will come from, and can use this information to prepare the network defences. As a result, computers behind the firewall can run only normal anti-virus software and still be reasonably safe, because serious, deliberate attacks are dealt with by the gateways.

However, emerging technologies such as peer-to-peer architecture and ad hoc communication networks mean that the concept of a static gateway is no longer applicable. For example, switching a mobile, wireless access point on or off at any time and place, and by doing so to join/leave a network of freely interacting devices means that the network topology is unstable.

The security systems for dynamic networks need to be able to cope with the threat of unknown viruses and inventive probing strategies as well as with dynamic topology. In the absence of adaptive defence mechanisms, these networks are vulnerable to new, yet undetectable forms of aggression, but also to attacks emanating from known malevolent entities, due to unexpected exposure of unprotected devices.

In a dynamic network, a node that is at one point safely located far behind the firewall can suddenly become directly exposed due to physical displacements or topological changes. An example of the first case might be a person walking out of office while talking on a mobile phone, and switching from "voice over IP" (presumably using a secure base station protected by the corporate firewall) to the normal cellular phone network. The second situation (topological change) could involve a fixed server that starts acting as the primary access point for external customers after one of its counterpart (normally in charge of automated online support) has failed. In both cases, a device that was once safely behind the firewall without any protection of its own suddenly needs to raise a firewall in order to keep safe and avoid becoming a backdoor.

SUMMARY

According to a first aspect of the invention, there is provided a method of operating a computer in a network of computers, comprising:
  receiving a beacon signal from an other computer in the network, said beacon signal identifying said other computer and comprising an indication of the software which has been run on the other computer;
  comparing the indication against a record of acceptable software so as to identify non-acceptable software use on the other computer; and
  if non-acceptable software use is identified then raising an alert level of the computer.

According to a second aspect of the invention, there is provided a method of operating a computer in a network of computers, comprising:
  monitoring the software run on the computer over a predetermined period;
  comparing the software run during the predetermined period against a record of acceptable software so as to identify non-acceptable software use on the computer; and
  transmitting a beacon signal to one or more other computers, said beacon signal identifying the computer; and
  if non-acceptable software use has been identified then including in the beacon signal an indication of software violation.

According to a third aspect of the invention, there is provided a computer for operation within a network of computers, comprising:
  means for receiving a beacon signal from an other computer in the network, said beacon signal identifying said other computer and comprising an indication of the software which has been run on the other computer;
  means for comparing the indication against a record of acceptable software so as to identify non-acceptable software use on the other computer, and if non-acceptable software use is identified then raising an alert level of the computer.

According to a fourth aspect of of the invention, there is provided a computer for operating in a network of computers, comprising:

means for monitoring the software run on the computer over a predetermined period;

means for comparing the software run during the predetermined period against a record of acceptable software so as to identify non-acceptable software use on the computer; and means for transmitting a beacon signal to one or more other computers, said beacon signal identifying the computer, if non-acceptable software use has been identified then including in the beacon signal an indication of software violation.

Embodiments of the invention provide a method of determining an alert level of a node in a network of other nodes that may be trusted nodes or non-trusted nodes, the method comprising the steps of receiving one or more beacon signals from one or more other nodes in the network, said beacon signal providing to the node an indication of the alert level of the other node and/or an indication of whether the other node is a trusted or non-trusted member of the network; and determining an alert level for the node based on the alert level in the or each received beacon signals and/or the indication of the trusted or non-trusted nature of the other node.

Further embodiments of the present invention provide an apparatus or method for use in a network security system that uses local inhibitory signalling to identify possible security breaches, and does not require explicit notification of appearing and disappearing threats. The system is also highly scalable. These features are advantageous in dynamic topology, as traditional security updates can be too frequent to be explicitly tracked in real-time and the size and shape of a domain can change dramatically (e.g. fusion of sub-domains). The system combines several desirable characteristics like simplicity, robustness, scalability and a balance of stability (locally predictable behaviour) and adaptability (spontaneous response to unpredictable changes).

The system is designed to increase the plasticity of network security systems, enabling them to react to topological changes so that defensive measures are concentrated at the periphery. This is provided by an adaptive firewall, kept "dormant" in nodes that are located in a safe environment, but spontaneously building up to full strength as soon as the device on which it is running is no more suitably protected.

BRIEF DESCRIPTION OF DRAWINGS

Embodiments of the invention are described below with reference to the accompanying figures in which.

DETAILED DESCRIPTION

Figure 1:
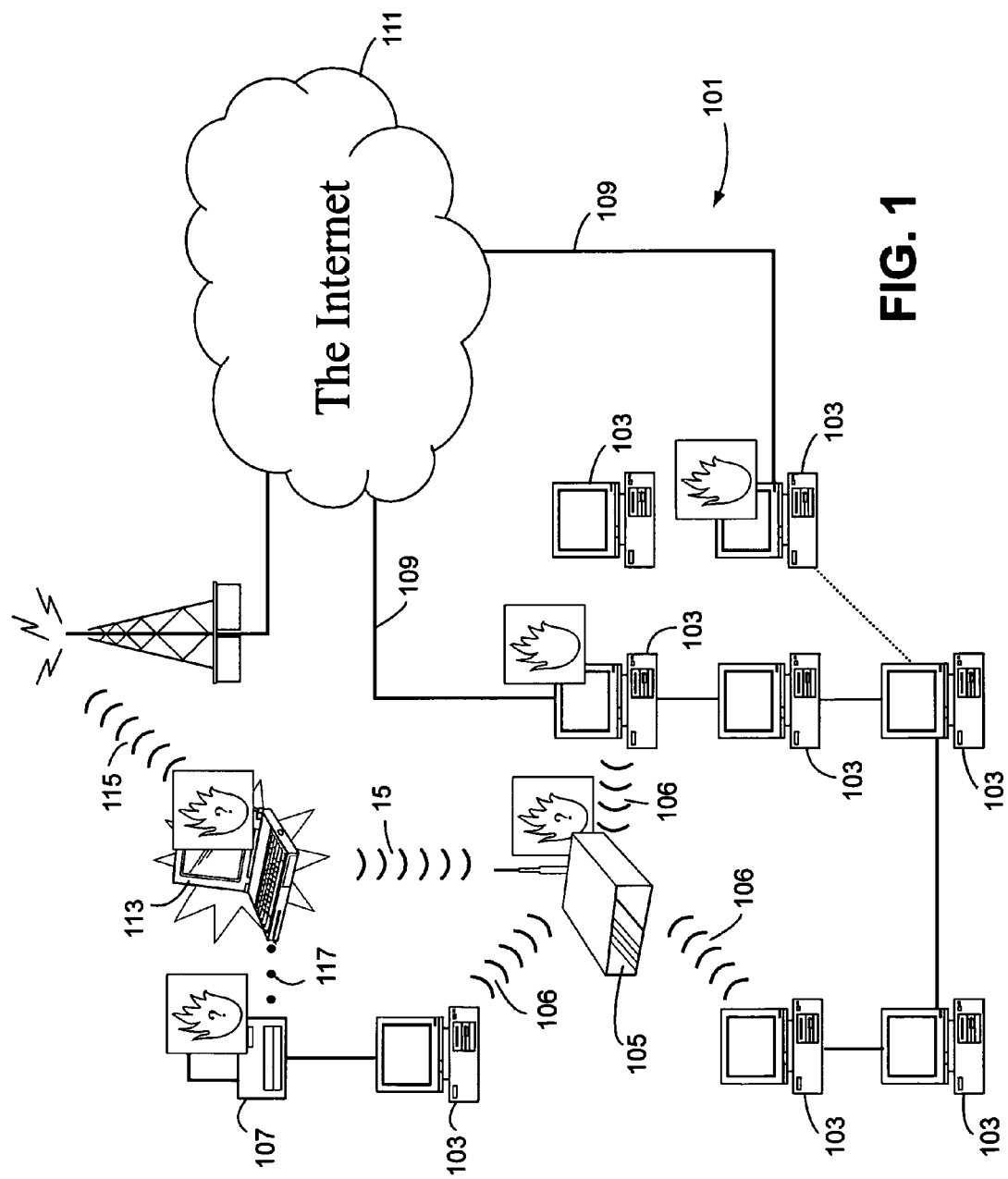
FIG. 1 is a schematic representation of a network demonstrating a security breach.

FIG. 1 provides an Illustration of a security break in a network 101 of computers 103. The type of security break is termed a "transient backdoor". The network 101 also includes a wireless local area network sever (WLAN) 105 arranged to provide wireless links 106 between some of the computers 103. The network also comprises a printer 107 and two connections 109 to another network 111 such as the internet.

The illustration of the security breach will be provided by considering the effect on the network 101 of the additional connection of a laptop computer 113. The laptop 113 is capable of making wireless connections 115 to the internet 111 and to the WLAN 105 and also an infra-red connection to the printer 107. Before the laptop 113 initiates the connection 115 to the internet 111 using a modem and a mobile phone, all machines 103, 105, 107 are safely located behind firewall software (indicated by the plain flame symbol in FIG. 1) running on the only two computers 103 directly linked to the Internet 111 by connections 109.

However, while the laptop 113 stays connected to the network 101, some parts of the system become vulnerable to attack. For example, the laptop 113 is legitimately connected to the WLAN 105 but may be connected to the Internet 111 via its modem and connection 115 causing a security breach i.e. opening a transient backdoor. The laptop 113 may also connect to the printer 107 via the infrared link 117. In order to counter this security breach firewall software would also need to be running on at least one of the devices showing the question mark flame symbol in FIG. 1 i.e. the WLAN 105, and the printer 107 as well as the laptop 113 (either on the laptop 113 or on both the printer 107 and the WLAN 105).

Considering the situation illustrated in FIG. 1, this could mean that high profile firewall software should be running on every single element of the network 101 that is capable of making a connection to a device such as the laptop 113. In other words, every device in the network 101 needs to be running firewall software. In a large network this will in practice be an impractical solution, especially if the network is a dynamic, peer-to-peer and/or ad hoc network. In such networks there are unlikely to be convenient entry points where it is possible to concentrate defensive efforts such as firewall software. Every mobile element in the network will become a possible insecure access point to the network. The problem is that in such architectures, several gaps can appear and disappear simultaneously, which can rapidly result in firewalls running where they are least needed, deep inside the core of the network, and not at the interface with the outside world where hostile entities are.

Figure 2B:
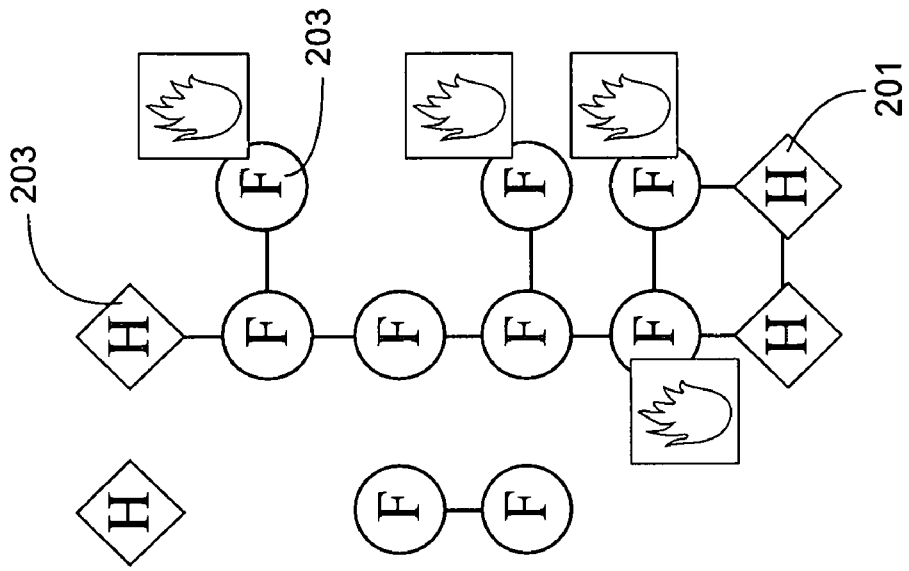
FIGS. 2a and 2b are schematic representations of nodes in a dynamic network illustrating topological modifications causing firewalls to run on the wrong nodes.
Figure 2A:
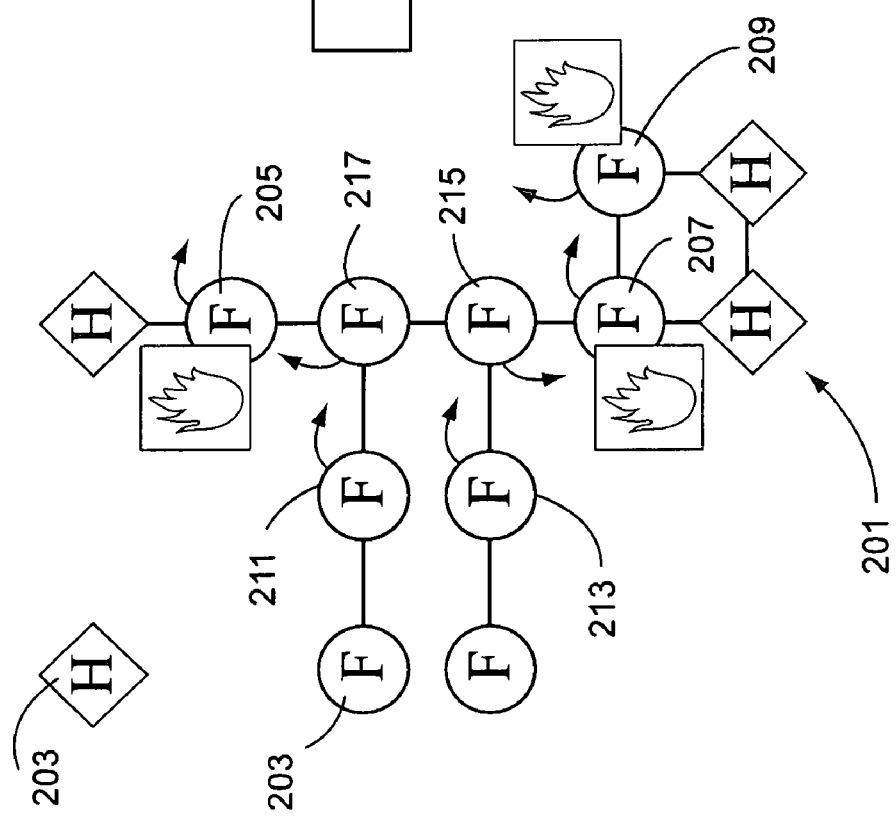

FIGS. 2a and 2b provide an illustration of topological modifications to a network 201 that has a dynamic architecture. The modifications cause firewall software to run on the wrong devices 203 in the network 201. The impending device movements are indicated by black arrows leading from the devices 203 in FIG. 2a. All friendly devices are indicated by the letter "F" and are protected from hostile entities that are indicated by the letter "H". Firewall software is running on devices 205, 207 and 209, which are those effectively in contact with the threat. The situation after the device movements indicated in the network 201a are shown in FIG. 2b. After the change, the firewall defences located on devices 205 and 209 have become useless and the network 201 is now open to attacks targeting devices 215 or 217. An appropriate response is this situation would be to switch off firewalls on devices 205 and 209 and transfer them to devices 215 and 217.

In embodiments of the invention, devices or nodes in the network are each provided with firewall or other suitable security software. The strength of the firewall running on each node is variable and measured by a real number (x) comprised between 0 (no security) and 1 (maximum security level). Each node periodically sends beacon signals to their immediate neighbours, those beacon signals consisting of a recognisable ID (which may be encrypted to avoid impersonation) and the current security level (firewall strength) of the sending node. The format of the beacon signal is described in further detail below.

Each node, on reception of its neighbours' beacon signals is arranged to calculate a new alert level for itself on the basis of its current status and the information contained in the N (or less) received beacon signal. This calculation is carried out using the following differential equation:

$$\frac{dx}{dt} = \frac{x(1-x)}{N}\left(N - n + \alpha \sum_{i=1}^{n} x_i\right) - \beta x \quad [1]$$

In equation [1], $n \leq N$ is the number of $1^{st}$ neighbours for which this node has received a properly formatted beacon signal, i.e. is a beacon signal including a recognisable tag identifying the sender as a trusted member of the community. The sum then represents the security level of the n trusted neighbours, (1−x) standing for saturation effects. The right-hand $\beta x$ term (with $0<\beta<1$) introduces a form of decay whereby firewall strength spontaneously lowers down if not compensated. It should be noted that since there is no independent term, x=0 is always a trivial solution of equation [1], meaning that if security is non-existent, it requires an external intervention to raise the security level above zero.

Examining limit cases provides useful information about system behaviour generated by equation [1]. For example, considering the situation where none of the N $1^{st}$ neighbours are trusted nodes (the device is isolated in the middle of potentially hostile peers), n is equal to zero and the sum is null. Equation [1] then becomes:

$$\frac{dx}{dt} = x(1-x) - \beta x = x(1-\beta) - x^2 \quad [2a]$$

and the (stable) positive solution is:

$$x = 1 - \beta \quad [2b]$$

In other words, provided that x>0 when a node is first set up (residual security), the alert level of any isolated node will progressively rise until it reached 1 (full security), at least if $\beta \ll 1$ which will typically be the case (spontaneous extinction of the firewall should be kept relatively slow).

Another interesting case is found for a network comprising only "friendly" nodes. In this case n=N and x should be identical throughout the system ($x_i$=x). In this situation equation [1] becomes:

$$\frac{dx}{dt} = \frac{x(1-x)\alpha N x}{N} - \beta x = \alpha x^2(1-x) - \beta x \quad [3a]$$

Eliminating the trivial solution x=0, expression [3a] becomes a simple equation of the second degree:

$$\frac{dx}{dt} = -\alpha x^2 + \alpha x - \beta \quad [3b]$$

admitting a stable and an unstable solution given by:

$$x = \frac{\alpha \pm \sqrt{\alpha^2 - 4\alpha\beta}}{2\alpha} \quad [3c]$$

Those solutions only exist if $\alpha>4\beta$, in which case the lower one acts as a threshold above which spontaneous decay cannot compensate for the combined self and cross-excitation among the nodes and the entire population goes to full security level (stable solution). Since in this scenario all devices are assumed to be trustworthy, this is obviously a pathological situation that should be prevented by careful selection of the parameter values ($\alpha$ and $\beta$) and of the initial firewall strength (x).

Figure 3:
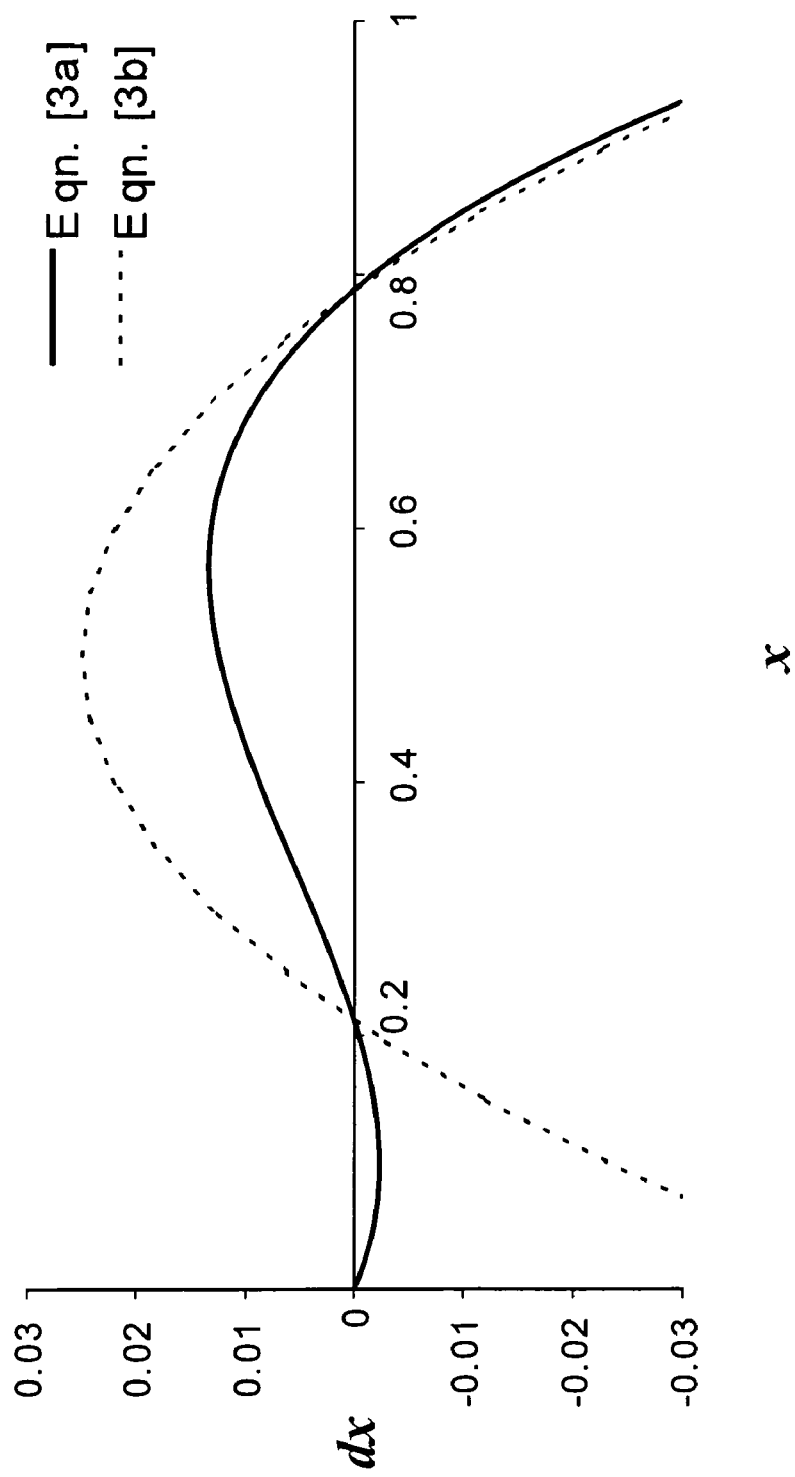
FIG. 3 is a graph showing the performance of an algorithm used in an embodiment of the invention.

FIG. 3 is a graph showing equations 3a and 3b to illustrate the variation of the excitation level (dx) as a function of firewall strength (x) for chosen values of $\alpha$ and $\beta$. From FIG. 3 it can be seen that the solution x≅0.2 is the unstable threshold while x≅0.8 is the maximum attainable security level for the values of parameters $\alpha$ and $\beta$.

The parameters values $\alpha$ and $\beta$ can be selected so that $\alpha>4\beta$-out of the range where the analytical solutions given by expression [3c] are real and comprised between 0 and 1. This arrangement prevents the pathological situation noted above and only the trivial solution x=0 stands. In other words, a community of mutually trusting nodes cannot "go paranoid" and regardless of the perturbation, they will eventually revert to a low security state. However, given the fact that the subsequent ability of nodes to quickly raise a firewall again is dependent on their latent security level, it is advisable to "artificially" keep this value above a chosen threshold >0. It will be assumed that this additional constraint is in place. The alpha and beta parameters should always have values between 0 and 1. In terms of the behaviour of the security level and in turn the associated security software such as a firewall, alpha governs the speed at which the alert level increases in the absence of the appropriate inhibitory signal (beacon), while beta determines how fast the node reverts to low alert when returning to a safe environment ($_{15}$' neighbours are trusted and on low alert).

Figure 4:
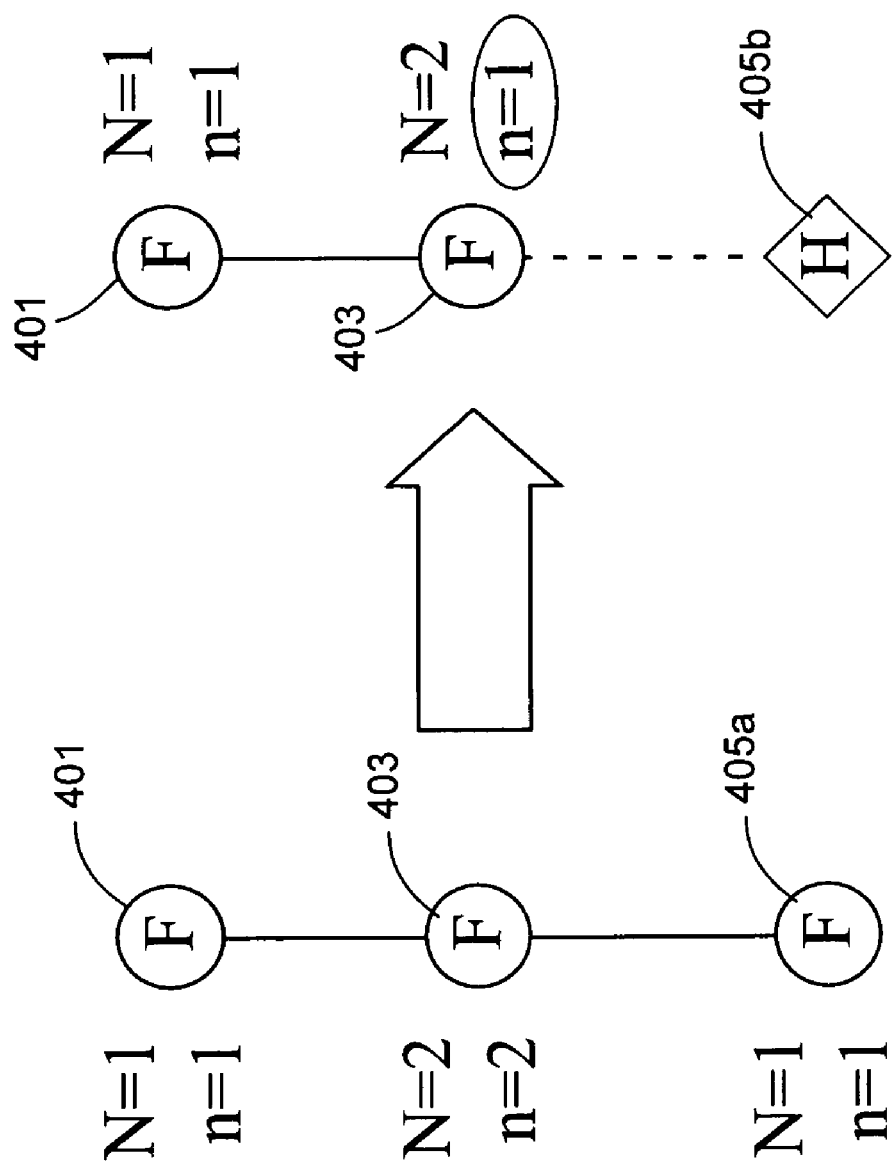
FIGS. 4a and 4b are schematic representations of nodes in a network operating in accordance with an embodiment of the present invention.

FIGS. 4a and 4b illustrates an example of three nodes 401, 403, 405 using the beacon signal system noted above. The nodes 401, 403, 405a are connected sequentially and as long as they are all remain friendly as indicated by the letter "F", expression [3b] stands and there can either be one (x=0) or three solutions (x=0 plus values given by [3c] as illustrated in FIG. 4a. However, if one node 405a is compromised or is replaced by an intruder 405b as shown in FIG. 4b, then its beacon signal should either disappear or not be recognised by its neighbour(s), resulting in n=1<N=2 for the middle node 403. In other words, the security breach resulting from the replacement of the trusted node 405a by a hostile entity 405b, and its effect on the value of n as used by its first neighbour node 403 when computing its new higher security level or alert status.

With reference to the example in FIGS. 4a and 4b, if the variables x and y represent the excitation level of the top device 401 and middle device 403 respectively, then any solution should satisfy the following conditions:

$$\frac{dx}{dt} = x(1-x)\alpha y - \beta x = 0 \quad [4a]$$

$$\frac{dy}{dt} = \frac{y(1-y)}{2}(1+\alpha x) - \beta y = 0$$

Which means there is potentially a steady state obeying:

$$y = \frac{\beta}{\alpha(1-x)} \quad [4b]$$

$$x = \frac{\alpha + \beta - 1 \pm \sqrt{(\alpha - \beta + 1)^2 - 4\beta(\alpha + 1)}}{2\alpha}$$

For example shown on FIGS. 4a and 4b, if α=0.3 and β=0.1, the alert levels would stabilise for x≅0.6 and y≅0.83, demonstrating that (for those chosen parameter values) the device 403 in contact with the threat 405b spontaneously raises a stronger firewall than its better protected counterpart 401.

As noted above, each node transmits and receives beacon signal. Depending on the particular network transmission medium employed the way in which the beacon signal information is transmitted may vary. However, in the present embodiment, the beacon signals comprise an indication that the signal is a beacon signal, a unique node or device identifier and indication of the security level of the transmitting node. The beacon signal indicator is placed in the header of the signal so that the data packets containing beacon signals can be distinguished from other packets in the network. The unique node or device identifier enables both nodes receiving beacon signals and a network manager or administrator to clearly identify each node or device. This identifier may be effectively a registration number for the node within the network. The calculation and use of the security level is described in further detail below.

Preferably, the beacon signal is encrypted for security. The beacon signal may be partially or completely encrypted. Where a signal is partially encrypted, at least the node identifier and the alert level should be encrypted. The encryption should be carried out with a key that is available to all trusted nodes in the network. This key enables the nodes to encrypt their own beacon signals for transmission and to decrypt received beacon signals. If a beacon signal is received from a non-trusted node then the decryption of the signal will not yield valid information thus indicating the non-trusted status of its sender. When the network manager or administrator chooses to denote one or more nodes or devices as non-trusted then the remaining trusted nodes are issued with a new encryption key. This causes the beacon signals of the newly non-trusted nodes to be corrupted.

Similarly, to gain access to the network, a new node or device would have to go through an application and verification procedure with the administrator or manager. This process preferable sets up a relationship between the administrator and a given node to enable encrypted communications between the two. This encryption should be carried out with a key that is unique to the node. This enables new beacon signal encryption keys to be sent to nodes securely and selectively so that newly non-trusted nodes to be shut out of the trusted network.

Figure 5:
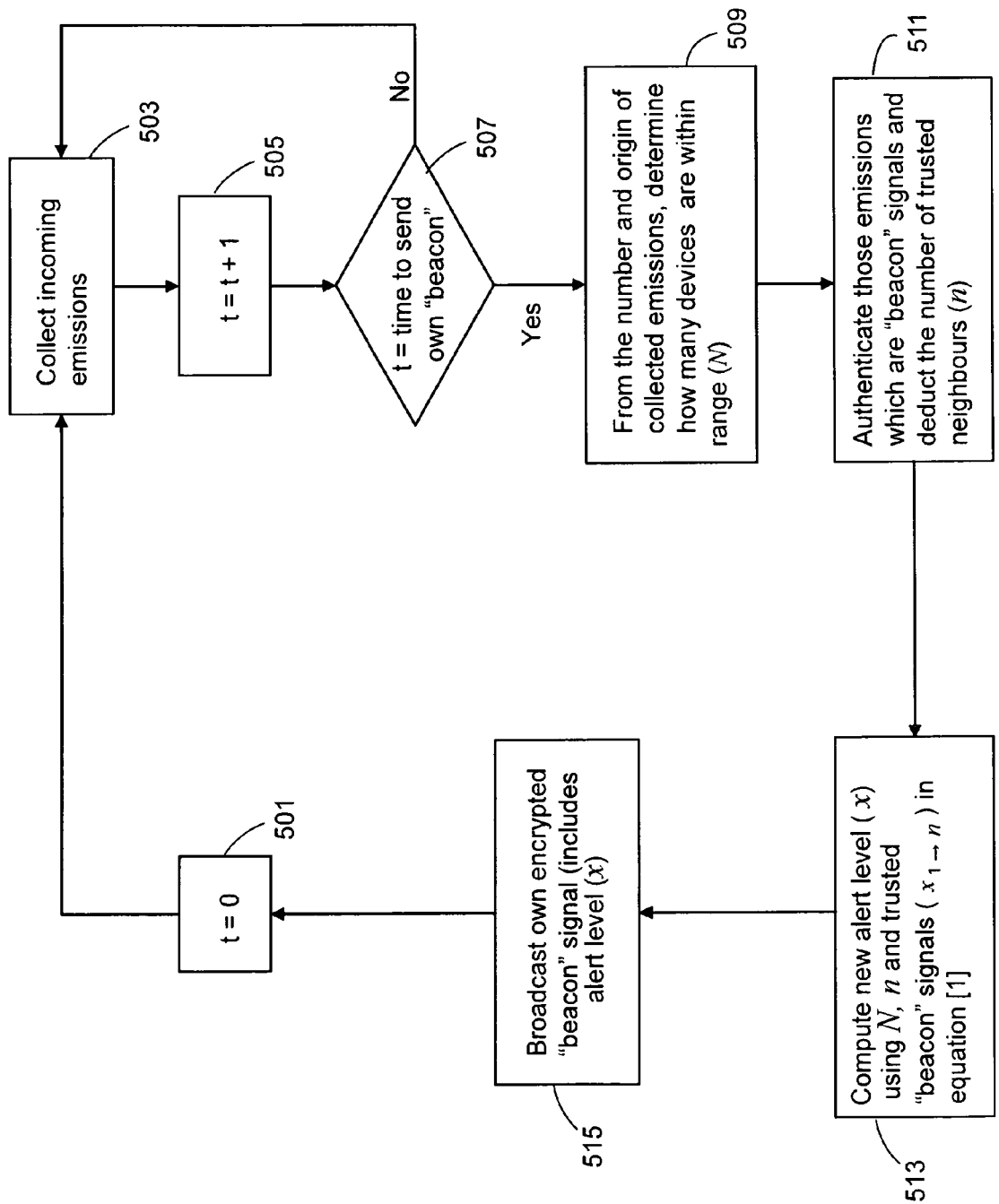
FIG. 5 is a flow chart illustrating the operation of a node in the network in accordance with an embodiment of the present invention.

The processing that each node carries out in order to establish its security level will now be described with reference to FIG. 5. As the node initiates its activity in the network, a timer is set to zero at step 501 and at step 503 the node collects incoming beacon signals from its neighbouring nodes. At step 505, the timer is incremented and processing moves to step 505 where a periodic check to determine whether the beacon signal of the node itself is due to be calculated and transmitted and if not, processing returns to step 503. If it is time to send a beacon signal then processing moves to step 509.

At step 509 all signals received from other nodes or devices are used to determine how many (N) are within range and at step 511, those signals that are recognised as beacon are authenticated to determine the number of trusted neighbours (n). Processing then moves to step 513 at which the node calculates a new alert level for itself using equation [1] above, the values for N and n calculated in steps 509 and 511 and the alert levels form the trusted beacon signals determined in step 511. Once the calculation is complete then at step 515 the node builds its own beacon signal, encrypts it and broadcasts the finished beacon signal. Processing then returns to step 501.

Figure 6:
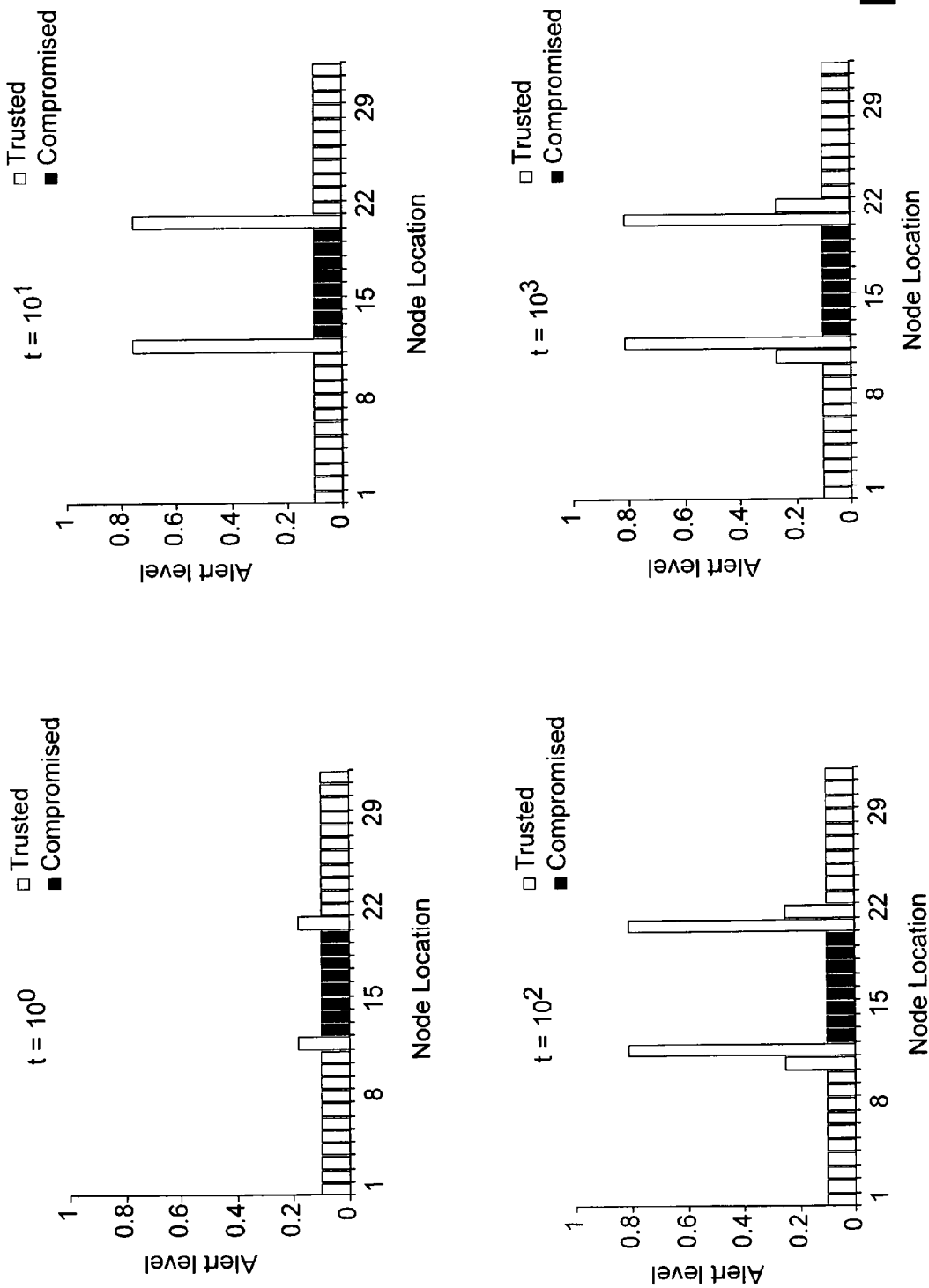
FIG. 6 is a set of bar charts showing the progressive rise of the alert level for trusted nodes in a network in the vicinity of non-trusted nodes.

FIG. 6 is an illustration of how a loop of 32 nodes would react to the middle 8being non-trusted as shown by the black bars. A graph representation is used to show four representations as time progresses (t=10⁰ to t=10³). The graphs show alert level of the nodes on the y– axis and the relative position of the nodes in the ring (with nodes 32 also being located next to node 1). As soon as nodes 12 and 21 stop receiving the appropriate inhibitory signal from their "right" and "left" neighbours respectively, the alert level of nodes 12 and 21 starts rising from the (imposed) minimum value of 0.1 (t=1). Nine time slots later (t=10) and nine non-trusted beacon signals will have been received from (or nine trusted beacon signals will be reported missing for) each of the non-trusted nodes 13 to 20. As a result, nodes 12 and 21 are near the maximum attainable firewall strength for those parameter values (a=0.3 and 8=0.1) in this one-dimensional architecture.

Later in the process (t=100), nodes 11 and 22 also increase their alert level because, although they receive inhibitory signals from both their immediate neighbours, the beacon signals from nodes 12 and 21 include the alert levels for those nodes. These are taken into account by nodes 11 and 22 when calculating their respective alert levels in accordance equation 1. In other words, the beacon signals from nodes 11 and 21 come with a security warning attached. This security warning can be regarded as a second defensive layer, and also has the highly desirable effect of lowering reaction time should node 12 or 21 become non-trusted as well. In other words the next potential targets would already be above minimum alert level if the inhibitory signal from nodes 12 and 21 became missing at a later time (indicating they may have also been compromised).

The effect of the system will now be illustrated in relation to a more complicated architecture such as a grid-like structure, with nodes arranged in a regular square lattice where each node has 4 immediate neighbours (instead of 2 as in the example described in relation to FIG. 6).

Figure 7A:
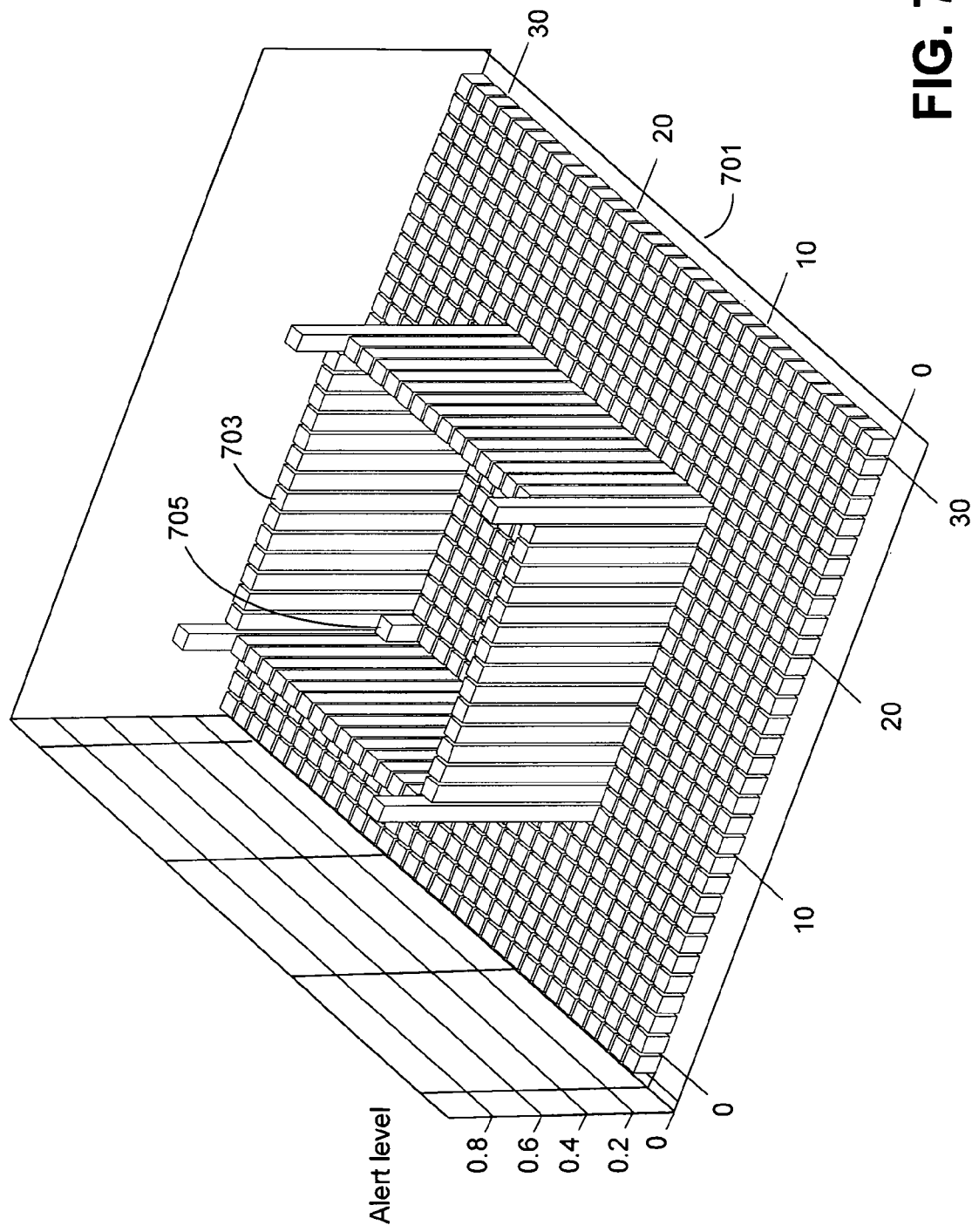
FIG. 7a is a three-dimensional bar chart illustrating the alert profile for a 16×16 grid of trusted nodes located in the middle of a larger non-trusted network comprising 32×32 nodes.

FIG. 7a is a three dimensional graph illustrating the security level of nodes in a network 701 in relation to their relative positions in the lattice. FIG. 7a shows the situation once a stable alert profile has been reached by a 16×16 domain of trusted nodes and located in the middle of a larger 32×32 network of non-trusted nodes. Spontaneously, the 256 mutually trusting nodes 701 differentiate into an enclosure 703 made of devices that are in contact with the outside world and are in charge of security (high alert level), and a group of 196 nodes inside the enclose 703 running a dormant firewall. The absence of a secondary defensive layer inside the enclosure is attributable to the fact that parameter values are the same as for the one-dimensional example (FIG. 6, $\alpha=0.3$ and $\beta=0.1$) while the number of neighbours monitored by each node is doubled (4 instead of 2). This results in the secondary defensive reaction being suppressed to some extent. However, evidence of this secondary reaction can be seen in FIG. 7a by the slightly raised security level of the nodes 705 at the inner corners of the enclosure 703. This is as a result of these nodes 705 having two immediate neighbours on high security alert at the periphery of the enclosure 703.

Figure 7B:
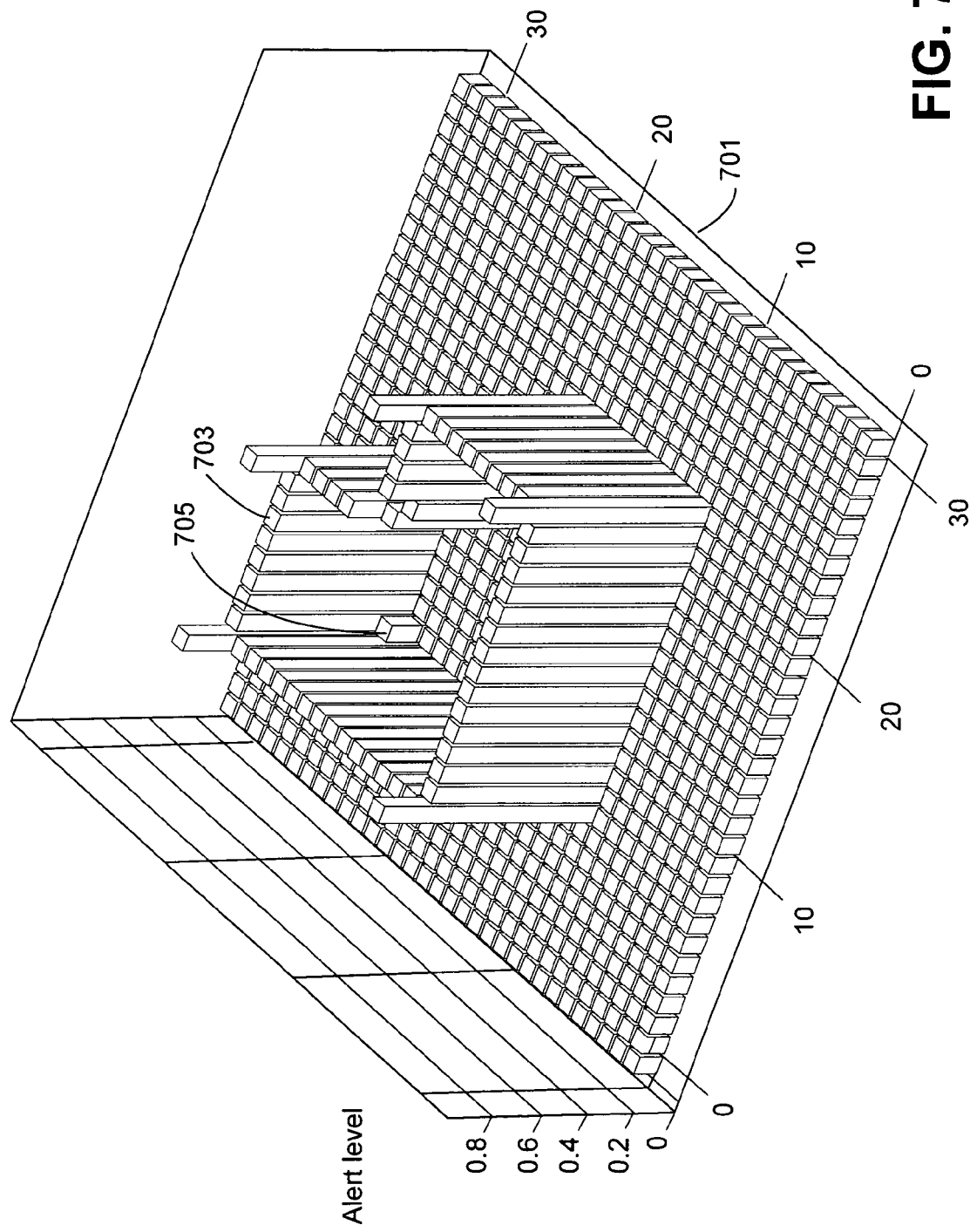
FIG. 7b illustrated the spontaneous reorganisation of the grid of FIG. 7a after some nodes have been excluded from the trusted domain.

FIG. 7b illustrates the spontaneous reorganisation of the enclosure 703 that is the reaction to some nodes being excluded from the trusted domain i.e. become non-trusted. In other words, the profile of the firewall software can change dynamically to respond to alterations of network topology. In this case, a portion of the original domain representing 25% of the nodes has been declared untrustworthy. Such situation could result, for example, from a human decision to exclude the corresponding sub-domain by distributing a new encryption key to the remaining 75%. This would result in the effective corruption of beacon signals from the old members since they are no longer recognised and so loose their inhibitory effect.

The purpose of the system described above is to compute an alert level that automatically and dynamically adapts to any change in the environment that has security implications. Typically, the opening of a security breach in a mobile architecture, such as an ad-hoc or peer-to-peer (p2p) network, can have 2 different origins:

A device in the network moves into potentially dangerous territory where it could be exposed to attacks by malevolent entities (e.g. outside the Firewall).

A non-trusted entity is breaking into a previously secure environment (e.g. a laptop is physically brought within range of another computer, so that a direct link can be established without passing through a protected entry point).

A node running the system described above would increase its alert level as a response to either of these changes, by detecting the presence of an information flow that is not associated with a properly formatted/encrypted beacon signal (n<N). Yet as will be understood by those skilled in the art, defining what changes in the security policy would result from this increased alert level remains the responsibility of the network administrator, and may vary substantially from one network to another.

Nevertheless, as will be understood, the node can use its alert level x to select among several security policies as defined by the network administrators. Traditionally, 4 generic security stances are defined:

1. Nothing is permitted (the paranoid approach)
2. Everything not explicitly permitted is prohibited (the prudent approach)
3. Everything not explicitly prohibited is permitted (the permissive approach)
4. Everything is permitted (the promiscuous approach)

Commonly, a network administrator will define several prudent and several permissive policies. For example in an e-mail scenario:

Permissive 1. Everything is permitted, except executable attachments
  Permissive 2. Everything is permitted, except executable attachments and use of wireless
  Prudent 1. Everything is prohibited, except text messages over a wired medium
  Prudent 2. Everything is prohibited, except encrypted text messages over a wired medium.

The transition between these policies can be governed by the alert level of the node, which itself depends on the presence/absence of non-trusted entities, their proportion in the environment, and the parameter values (which should also be chosen by the administrator to reflect his/her security concern). For example, an alert level x<0.25 could be interpreted as Permissive 1, 0.25<x<0.5 as Permissive 2, 0.5<x<0.75 as Prudent 1 and x>0.75 as Prudent 2.

As will be understood by those skilled in the art, the system may be implemented with nodes having differing levels of trust between each other. In other words a node may be partially or completely trusted, with a partially trusted node only being allowed to carry out a subset of all the operations within the network. The partially trusted nodes will be able to maintain a connection with the network but the security system will make sure that this is at a higher security level than connections with trusted devices that will be more permissive. This may be implemented by including in each beacon signal, a trust level for the node that will have been assigned by the network administrator. This trust level may act as a set of privileges i.e. defining the node's allowed operations, or it may serve to step up the alert level of the trusted nodes that the partially trusted node makes connections with.

It should also be noted that, due to the self-amplifying nature of the system, some of these states are likely to be unstable, which could be a very desirable feature if properly used. For example, if a non-trusted device is present on the network and triggers Permissive 2, x (the alert level) could start rising on its own and eventually reach Prudent 1 unless the threat disappears. This would be equivalent to the system autonomously, spontaneously and implicitly making a distinction between a transient risk (non-trusted wireless-enabled laptop accidentally passes by), temporarily requiring a slightly higher profile, and a dedicated hacking attempt (the presence of an unidentified device is recorded for several minutes), calling for more elaborate countermeasures.

The system should be regarded as a way of never exceeding a constant level of acceptable risks in a changing environment, knowing that these risks can be relatively high (like allowing 10% of unidentified devices within communication range before moving to Permissive 2 for example). Indeed, it is always the case that efficiency and security have to be balanced against each other, and the system provides a means of maintaining such balance in the particularly demanding circumstances of an unpredictably dynamic threat.

Equation [5] below is an alternative to equation [1] described above.

$$\frac{dx}{dt} = \frac{x(1-x)}{N^\gamma}\left(N - n + \alpha \sum_{i=1}^{n} x_i\right)^\gamma - \beta x \quad [5]$$

If the exponent gamma in equation [5] is higher than one, it will slow down the rise in alert level, if it is lower than one (it should always be positive though), it will have the opposite effect (make it faster). This equation enables adaption to higher dimensions of connectivity in the network. For example, if a node has ten neighbours (N=10, five dimensions in a square lattice), it may be desirable to for the nodes alert level to rise more quickly even if you are still strongly inhibited i.e. receiving trusted beacon signals from most surrounding nodes. For example, two non-trusted nodes could look negligible when submerged in the beacon signals inhibiting the nodes defences (unlike when there were four neighbours). However, this doesn't necessarily mean that two compromised neighbours are less of a threat, so in order to compensate, the administrator (or some kind of adaptive algorithm) can lower gamma so that two missing beacons out of ten are taken as seriously as two missing beacons out of four.

As will be understood by those skilled in the art, the equation [1] and [5] could be further modified to respond to specific conditions, for example increasing non-linearity, by introducing constants or further exponents.

In the embodiment described above, once trusted device that has been designated as non-trusted by the network administrator it is treated as a "non-member" and this increases the alert level of its neighbours. However, it is a further advantage to make detection of the threat automatic or, in other words, to make sure that a node that has been infected with a virus is recognised as such and triggers the security system response without the need for human intervention. This spontaneous reaction helps contain an virus epidemic by switching on defences in the vicinity of its original penetration point (i.e. on the first infected node's immediate neighbours), without affecting the entire network's operations.

As discussed before, the beacon signal inhibiting alert level build-up may be encrypted so as to avoid impersonation of trusted entities by malevolent ones. An advantage of using inhibition rather than excitation is that the presence of a threat does not have to be explicitly notified in order to trigger a defensive response. It is enough that the beacon signal disappears or is altered. Detecting that a trusted neighbour has been infected doesn't require that the virus be identified. It is enough that the compromised node stops broadcasting the correct beacon signal.

In a further embodiment of the present invention, trusted nodes in a network are only allowed to run a given set of applications. Furthermore, the beacon signal encryption algorithm uses the internal state of the signalling node as part of its key. As a result, any node that has been infected with a malicious self-executing code (such as a Trojan horse) would start broadcasting an invalid beacon signal, even if the user/machine is unaware that it has been compromised. The device's neighbours would spontaneously adapt their security profile, and even though the threat might still remain completely unidentified, it might be counter-acted by the systems pre-emptive reaction in isolating the node.

The task of an invading entity becomes much more difficult, as even attacking the security system on the contaminated node would not enable it to spread further into the network. The only way for an active virus to remain undetected may be to break the encryption system to enable it to send the appropriate beacon signal even though the internal state of the infected node has changed. This would be difficult for an autonomous entity and would itself limit virus proliferation. Even if an entity had the ability to crack the encryption system, it would still probably miss at least a few beacon signals in the process, which could be enough to trigger an irreversible reaction by its neighbours if the system parameters are configured appropriately.

Worms or viruses often use other software applications as entry points (backdoors) into a computer system by taking advantage of existing loopholes in the software. Those may be identified and corrected before a virus spreads but only if this is done in time by, for example, by installing repair software often referred to as a patch. As a result, the security system has two ways of detecting a possible security breach. The first is that an unauthorized software application is or has been running. The second is that an authorized software application has not been updated to its latest version. In order to detect that unauthorized or out of date software has been used, the security system uses a log file. A node that has used unauthorized or out of date software may not be able to detect such a fact. However it will continue broadcast a beacon that is no longer recognized by those nodes that have run only authorized or up-to-date software.

Take an example where a virus uses a loophole in Internet Explorer to attack a node and then corrupts an Excel file with a macro and that Excel file is then sent as an attachment using Microsoft Outlook to another node. In this case, even if it own version of Internet Explorer has been patched, another node could still receive the virus infected attachment because neither Excel nor Outlook are the source of the problem. However, if the security system as described herein is in use, then using an outdated version of Explorer would alter the beacon signal resulting in the node being treated as non-trusted by other nodes. This could mean (depending on the administrator's more or less relaxed attitude toward security) that all macros coming from the infected machine may be automatically disabled. In other words, while Explorer is the backdoor, even patching that software does not solve the security loophole unless the security system herein is also deployed.

In this system, the beacon signal as described above is modified by the addition of a summary of the log file. The log file has an entry placed in it each time a particular piece of software is run on the node. The entry comprises an identification of the software and its version. The node also holds a table of allowed and mandatory software. This table lists all the software that must be running on a node as well as the software that may be run. Each entry in the table also specifies the version of the mandatory or allowed software.

Figure 8:
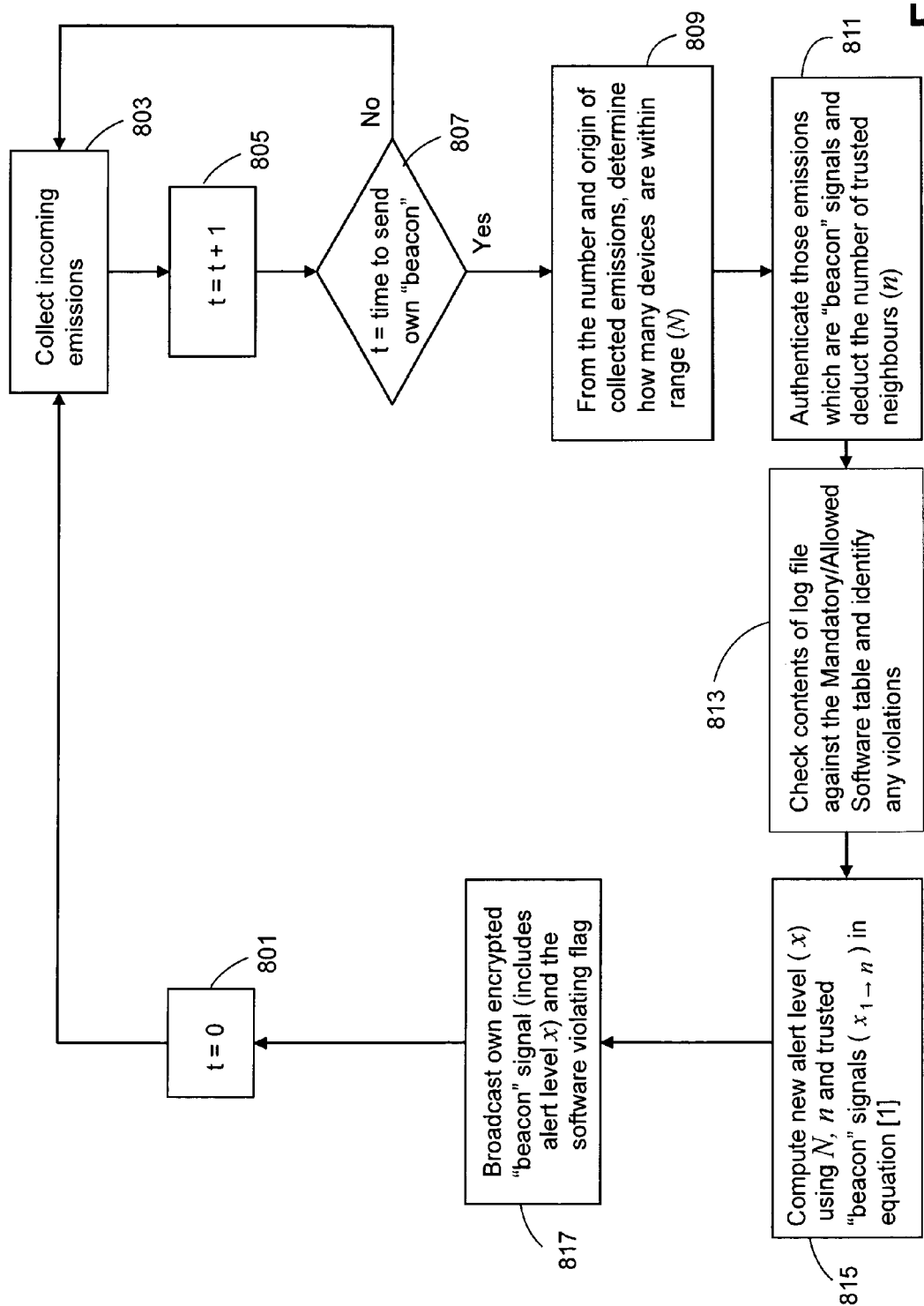
FIG. 8 is a flow chart illustrating the operation of a node in accordance with a further embodiment of the invention.
Figure 9:
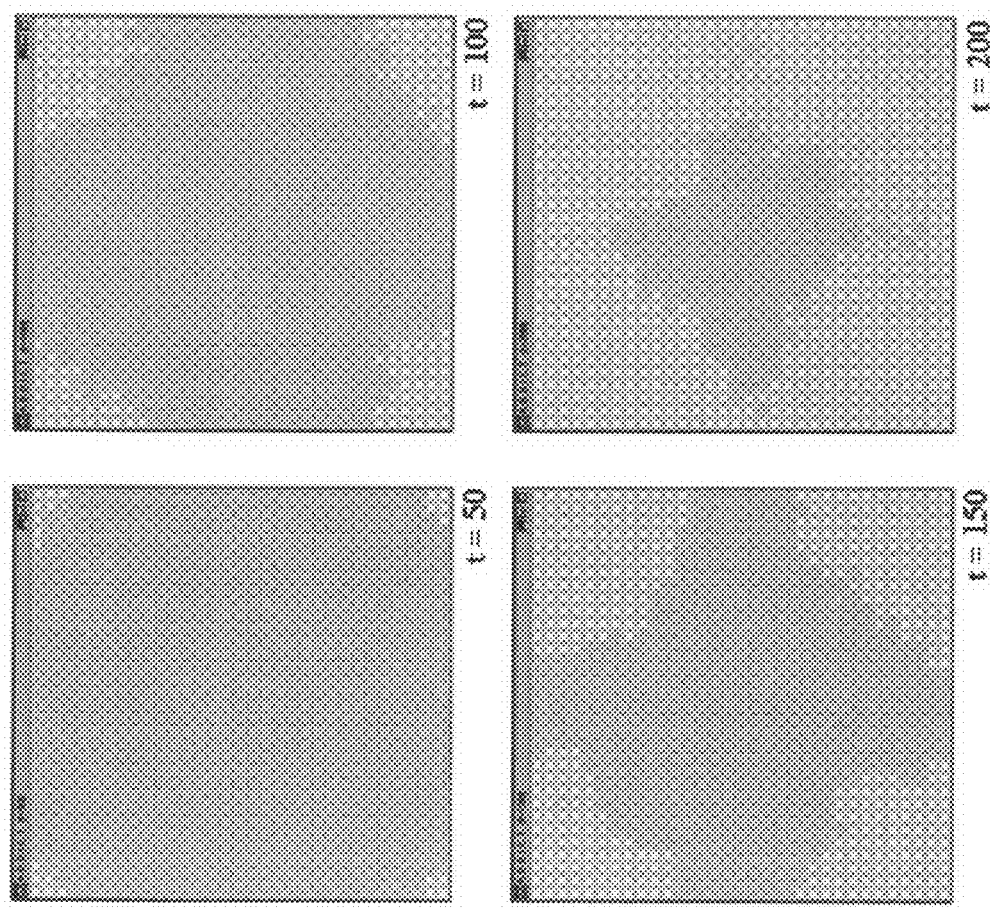
FIG. 9 is an illustration of the propagation of a virus in a homogeneous, low security network.

As will be explained in further detail below with reference to FIG. 8, the node uses the contents of the log file and the software table when determining its own beacon signal. Essentially, if the log file shows that mandatory software has not been running or that prohibited software has been then a violation flag is generated. This flag effectively corrupts the beacon signal resulting in the emitting node becoming non-trusted in the network. The system may also be arranged to work with virus detection software so that if such software detects a virus or other undesirable entity then the violation flag is generated.

The software table will be updated by the network administrator as is necessary to take in to account new, more secure versions of software, updated virus software, software that has been identified as insecure or patched software. These communications between nodes and the administrator should be encrypted in the same manner as the communication to the nodes of new encryption keys for beacon signals.

It should be noted that not sending the proper beacon does not necessarily mean that a node is ejected from the network (i.e. denied all services). It may only mean that a node is treated as being outside the firewall and so given restricted access such as incoming e-mails being stripped of any attachment. Otherwise, if a node is unknowingly running an outdated version of some software that as been identified as containing a security loophole, then the node should be denied the usual privileges until the software is updated. If the node was denied all access to the network, this may prevent the node from downloading the updates to the software and so trap the node in an impossible situation. Clearly, such details are under the responsibility of the network security administrator.

As will be appreciated by those skilled in the art, the system described above of log files and an allowed/prohibited software list could be applied to nodes of a network independently of the beacon signal mechanism described above. Instead, it could be applied in more traditional firewall security situations. Also, while the log file system described is used to detect the arrival of a virus or other such malicious entity, this system could be substituted for or complemented with other know method or systems for identifying the existence of such entities.

The processing that each node carries out in order to establish its security level will now be described with reference to FIG. 8. As the node initiates its activity in the network, a timer is set to zero at step 801 and at step 803 the node collects incoming beacon signals from its neighbouring nodes. At step 805, the timer is incremented and processing moves to step 807 where a periodic check to determine whether the beacon signal of the node itself is due to be calculated and transmitted and if not, processing returns to step 803. If it is time to send a beacon signal then processing moves to step 809.

At step 809 the beacon signal received from other nodes or devices is analysed to determine how many (N) are within range and at step 811, for the beacon signal that are in range, the signals are authenticated to determine the number of trusted neighbours (n). At step 813, the node checks the contents of the log file against the allowed and mandatory software table. If there is no entry in the log file for the correct version of mandatory software or and entry for software that is not allowed or allowed but the wrong version, then the software violation flag is activated. Processing then moves to step 815 at which the node calculates a new alert level for itself using equation [1] above, the values for N and n calculated in steps 809 and 811 and the alert levels form the trusted beacon signals determined in step 811. Once the calculation is complete then at step 817 the node builds its own beacon signal that includes the alert level and the software violation flag determined in steps 815 and 813 respectively. The node then encrypts and broadcasts the finished beacon signal and processing then returns to step 501.

In the preferred embodiment of the invention, a plurality of the security mechanisms described herein have been combined to enhance the security as much as is possible. Accordingly, each node will monitor and maintain a record of software which it runs during a predetermined period. The log file is added to the beacon signal transmitted to other nodes, thereby sending to the other nodes an indication of the software which has been run on the first node. This allows the other nodes to compare the software run on the first node against the table of allowed/mandatory software which each of them holds. Every node thereby has the opportunity to identify any non-acceptable software use (including unauthorised software, out of date software or non-use of mandatory software) occurring on the first node, which might be indicative that the first node has been attacked, but without the first node itself being aware of that fact. The other nodes can therefore raise their alert levels appropriately, thereby isolating any penetration point by surrounding it with a higher level of security. An appropriate method of raising the alert level in response to identifying the non-acceptable software use might comprise, for example, setting the first node to be one of the untrusted nodes in the network, used within equation [1] described earlier.

In addition, in the preferred embodiment, before sending a beacon signal, each individual node compares its own software log against its own table of allowed/mandatory software. This may identify non-acceptable software use, in which case a software violation flag is additionally included in the beacon signal so as to provide an easy indication to the other nodes that non-acceptable software use has occurred on the first node. One particular advantage of performing this test is when the table of allowed/mandatory software has been updated on the first node but, for whatever reason, has not yet been updated on another node. In this case, the first node identifies the non-acceptable software use and indicates this via the violation flag in its beacon signal to the other node. The other node is then aware of some non-acceptable software use, even though it might not have detected it itself because its own table was out of date.

Finally, in the preferred embodiment, the nodes are arranged to encrypt their beacon signals based on their internal state. This is an extra mechanism for the first node to provide to the other nodes an indication of the software which has been run on the first node. For example, any prohibited software operating on the first node, such as a malicious self-executing code would alter the internal state of the node. The resulting beacon signal would therefore be invalidly encrypted, and any other nodes receiving such a signal would therefore be able to identify that non-acceptable software use had occurred, and raise their alert levels appropriately.

The operation of the system will now be described with reference to FIGS. 9 to 12. The spreading of a virus or worm in a grid-like architecture is normally a function of the rate at which security checks are conducted and where they are conducted. Both a homogeneously low alert level and a poorly located high-intensity firewall would result in very fast contamination, and vice versa. However, the real challenge for security systems is to stop or slow down an epidemic that has already started, by automatically switching on defensive systems on previously safe nodes as the threat approaches them. This is the equivalent of raising and lowering firewalls to answer the demands of a dynamic topology involving mobile nodes. It makes no real difference whether a member device stops being inhibited because it enters in contact with unregistered peers or a previously trusted counterpart to which it is connected has been infected. Moreover, the effect of this rising alert level of a particular node on its trusting neighbours will also be equivalent in both cases.

When establishing the effects of a virus, the properties of the virus or worm itself have to be taken into account. What also really matters when comparing the relative efficiency of dynamic and static security systems is that the propagation mechanism of the malicious entity (and therefore its inherent spreading pattern) is kept constant. The simulation described below, involves a worm that attempts to propagate (attack one of its 4 potential targets, selected at random) at the average rate of one trial every ten beacon pulses (constant probability of 0.1). It is also assumed to be 100% successful in infecting the target as soon as a single contaminated packet has passed through the firewall (i.e. has not been inspected, recognised as harmful, and deleted). In this respect, the results described below correspond to a worse case scenario of a lightweight, fast-moving and highly efficient malicious entity.

The parameter values chosen for the system always involve $\alpha=3\beta$, so that the inequality given above ($\alpha>4\beta$) is not satisfied, meaning there is no real and positive solution for equation [3c]. Nodes can therefore not "go paranoid" and will always spontaneously revert to the non-excited state if no threat is present (floor level is arbitrarily set to x=0.1). These values are meant to represent the routine status of the dynamic defence system before the worm attack is detected. In other words, it is assumed that as long as there is no danger notice, the network administrator has opted for a low security, high efficiency strategy. Obviously, part of the job of managing an on-going epidemic may involve changing parameter values in real-time so as to invert those priorities and tune the system to a particular threat. FIG. 7 illustrates a special situation involving no specific defences either static or dynamic and is used as a benchmark describing worm propagation in a non-protected environment (all nodes start and keep the minimum alert level x=0.1). The network is shown as a grid structure with light coloured nodes indicating an infected or non-trusted node and darker nodes remaining trusted. FIG. 7 shows several snapshots (t=50 to t=200 beacon signals) of the worm's progression when starting from a single node (top left corner) and propagating in the 32×32 node network with periodic boundaries.

Figure 10:
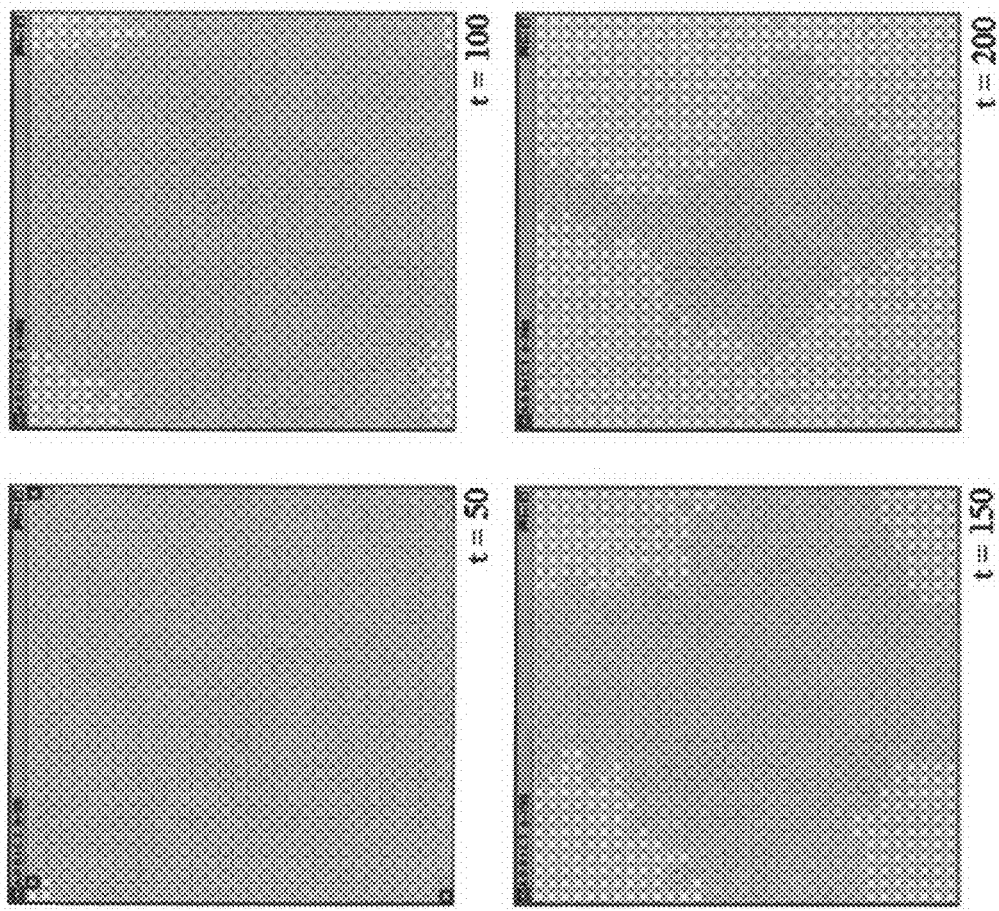
FIG. 10 is an illustration of the propagation of a virus in an environment protected by traditional static firewalls in a network.

The same illustration is then reproduced in FIG. 10, with the same initial conditions, except that a static firewall isolating the infected node (still top left) from the rest of the network is in place. This is roughly equivalent to a traditional perimeter defence, with 4 devices (the first neighbours of the compromised node) acting as obliged gateways to access the protected environment (and therefore being in charge of all security checks). As can be seen on FIG. 10 (t=50), this has indeed an effect on the epidemic: the propagation of the worm is slowed down in its early stage, due simply to the fact that its first attempts are successfully intercepted by the firewall. However, eventually, it gets through and one of the machines running the static firewall is infected. This opens a breach in the network's defences and by t=50, 2 nodes have already fallen to the worm. The problem is that those contaminated devices are behind the firewall and can subsequently be used as backdoors since they are implicitly trusted. So from that point, it becomes just as easy for the worm as it was in the "no defences" scenario of FIG. 9. Although initially delayed in FIG. 10 (see t=100), the epidemic rapidly catches up and has reached about the same intensity by t=200 as the attack in FIG. 9 where there are no defences.

Figure 11:
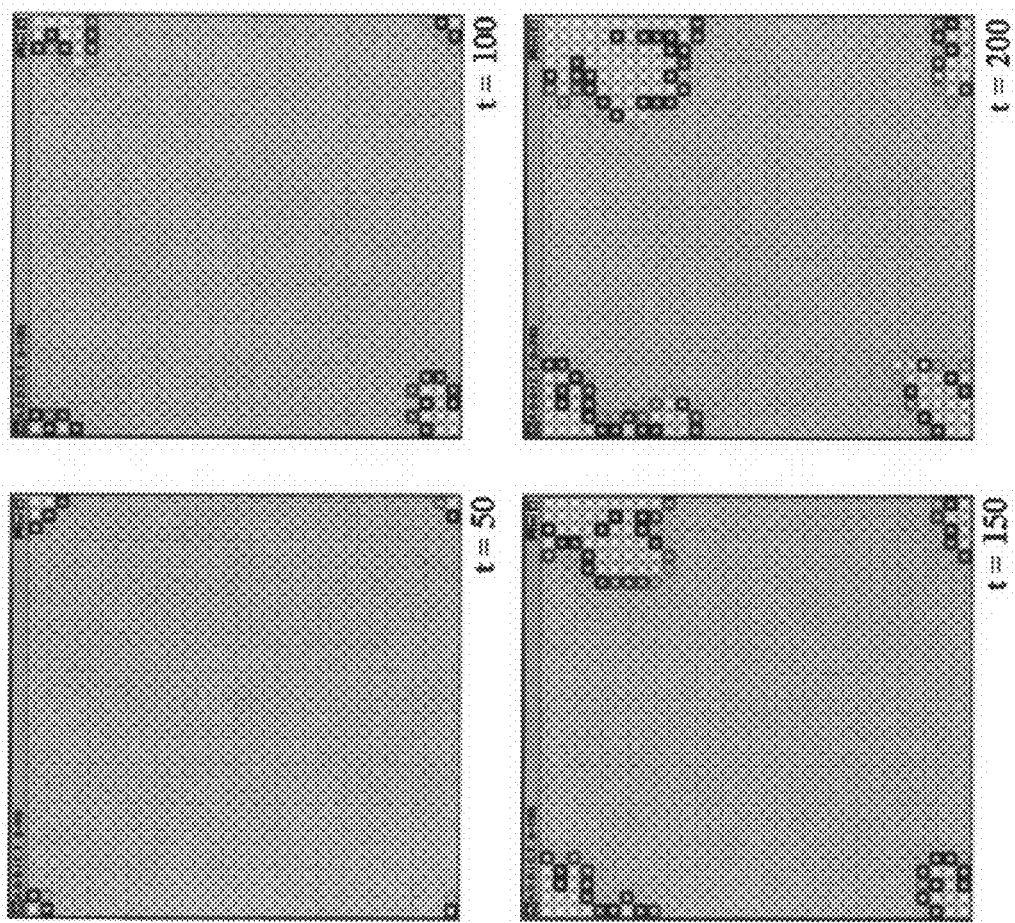
FIG. 11 is an illustration of the propagation of the worm in a network of nodes operating the security system illustrated in FIG. 8.

FIG. 11 illustrates the scenario when the security system of the present invention is employed in the simulation. The initial conditions are similar to those of the "static defence" scenario described with reference to FIG. 10, with the 4 nodes originally in contact with the threat having adopted a high security profile. However, in FIG. 11 the system effectively starts at a disadvantage because, unlike before, the firewall is not running at its highest possible intensity of x=0.95 on the gateways. In fact, each one of the four nodes initially has 3 trusted neighbours out of a total of 4, which reduces their alert level (equation [1]). Yet despite this handicap, FIG. 11 shows that dynamic defence performs better in the long run and effectively slows down the spread of the virus. The reason for this is that, unlike the static perimeter firewall, the system is capable of continuously putting new obstacles in the path of the worm after the original frontline has been breached. So in effect, life never becomes easier for the malevolent entity because each time it succeeds in infecting a new device, all next potential targets spontaneously raise their own firewall to resist its progression. So after a slow start (4 infected nodes instead of 2 with the static firewall at t=50), the security system manages to slow down the epidemic to a considerable extent (compare with the situation at t=200 in FIG. 10).

Of course, those results are only given as an example, since a worm with other properties would spread at a different rate in all 3 situations, which could result in the system being no more efficient than static defences in some circumstances. Generally speaking, if the threat is spreading faster than new firewalls can be raised (which in turn depends on the relative values of $\alpha$ and $\beta$), dynamic defences obviously can't improve resilience. So FIG. 10 should be regarded as an indication of the performance of the system compared to that of a more traditional approach of network security, and not as a proof that it would always be superior.

Figure 12:
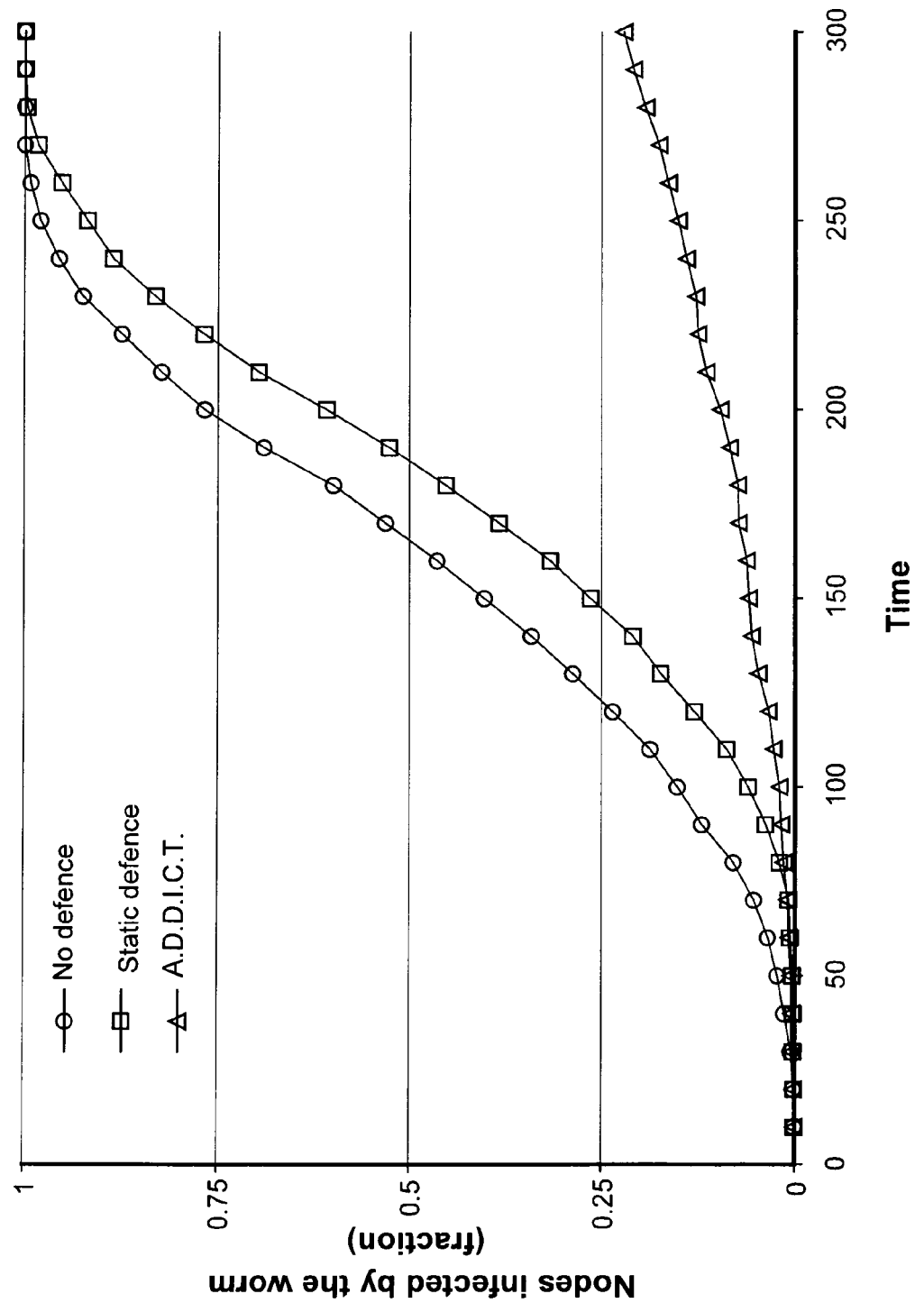
FIG. 12 is a graph showing the evolution of the fraction of nodes infected by the virus for the three scenarios illustrated in FIGS. 9, 10 and 11.

FIG. 12 is a graph showing the evolution of the fraction of nodes infected by the worm for the 3 security scenarios described above in FIGS. 9, 10 and 11 (no defence, static perimeter defence and dynamic defence respectively). The graph shows that the traditional approach only delays the outbreak by making it more difficult for the worm to penetrate the network. Once the worm is inside the network though, its progression rate is unaffected (similar curve, shifted to the right in FIG. 12). On the contrary, the security system describe herein directly affects the spreading dynamics, slowing down the epidemic in the long term.

Numerical evaluations of what level of alert would be required in a conventional system to slow down the worm to the extent that the security system described herein does show it to be slightly above $\chi=0.7$, while the minimum (and most widespread) alert level allowed in the dynamic defence scenario was $\chi=0.1$. This is quite a dramatic advantage, even when taking into account the extra-traffic represented by the beacon signals themselves.

Nodes may be arranged to transmit beacon signals that omit the alert level from the signal specifically but instead modify the emission frequency of the beacon signal. In other words as the frequency of beacon signal emission is increased as the alert level rises. Other means for communicating the same data as contained in the beacon signal will be clear to those skilled in the art.

The description of the mechanism for detecting the use of prohibited software or the non-use of mandatory software described above with reference to FIG. 8 is only one of a number of ways in which such a system may be implemented. In an alternative implementation, a list of applications is maintained that is mapped onto a series of flags (bit-string). Which of these flags should always (mandatory software) or never (forbidden program) be raised does not need to be explicitly known from within the node as it makes it more difficult for a malevolent entity to determine what is the valid bit-string to pass to the encryption algorithm in order to compute the beacon signal. For example, if the first bit of the bit-string corresponds to a mandatory on-access scanner, the second and third bits to forbidden browsers, and the fourth bit to an authorised word processor, then the bit-string passed to the beacon generator will yield an invalid signal unless it starts with either "1001" or "1000". A virus could find out that "1010" for example does not produce a correct beacon by checking the list of accepted beacons maintained by the contaminated node. However, unless the virus has also cracked the encryption algorithm itself, it would not be able identify the cause. It may be that this on-access scanner is forbidden (first bit should be "0") or that the first browser is mandatory (second bit should be "1"). At this stage, there is no way to tell that an invalid beacon has been generated due to the fact that the 3$^{rd}$ bit is "1" (use of the second browser is forbidden). In other words, a flag should not be raises only when something wrong occurs because this makes the system too easy to crack. A bit (flag) should be set to "1" if the corresponding application is (has been) running and to "0" if it is (was) not, but without knowing what is mandatory and what is forbidden (and therefore what should be "1" or "0" respectively).

It will be understood by those skilled in the art that the apparatus that embodies the invention could be a general purpose device having software arranged to provide the an embodiment of the invention. The device could be a single device or a group of devices and the software could be a single program or a set of programs. Furthermore, any or all of the software used to implement the invention can be contained on various transmission and/or storage mediums such as a floppy disc, CD-ROM, or magnetic tape so that the program can be loaded onto one or more general purpose devices or could be downloaded over a network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A method of operating a computer in a network of computers, comprising:
    receiving a beacon signal from one other computer in the network, said beacon signal identifying said other computer and comprising an indication of a software which has been running on the other computer;
    comparing the indication against a record of acceptable software so as to identify non-acceptable software use on the other computer; and
    if non-acceptable software use is identified then raising an alert level of the computer;
    wherein the indication of the software comprises the beacon signal having been encrypted using an internal state of the other computer as part of an encryption key;
    wherein the beacon signal provides to the computer an indication of the alert level of the other computer and an indication of whether the other computer is a trusted or non-trusted member of the network; and determining an alert level for the computer based on the indication of the alert level and the indication of the trusted or non-trusted nature of the other computer.

2. The method according to claim 1, in which the indication of the software comprises a log file comprising a plurality of entries, wherein each identifying software entries use on the other computer.

3. The method according to claim 1 in which the indication of the software comprises a series of data flags, wherein each data flags representing software use on the other computer.

4. The method according to claim 1, further comprising transmitting a signal to one or more additional computers, said signal comprising an indication of the alert level of the computer.

5. The method according to claim 1, in which the record of acceptable software comprises a set of mandatory software applications, and identifying non-acceptable software use when the step of comparing determines that an element of the set of mandatory software has not been run on the computer.

6. The method according to claim 1, in which the record of acceptable software comprises a set of prohibited software applications, and identifying non-acceptable software use when the step of comparing determines that an element of the set of prohibited software has been run on the computer.

7. The method according to claim 1, in which the indication of whether the other computer is a trusted or non-trusted member of the network comprises the indication of the software which has been run on the other computer.

8. A tangible computer storage medium for storing computer readable code representing instructions for causing one or more computer processors to perform the method according to claim 1 when the instructions are executed by the one or more computer processors.

9. A method of operating a computer in a network of computers, comprising:
    monitoring a software run on the computer over a predetermined period;
    comparing the software run during the predetermined period against a record of acceptable software so as to identify non-acceptable software use on the computer;
    transmitting a beacon signal to one or more other computers, said beacon signal identifying the computer; and
    if non-acceptable software use has been identified then including in the beacon signal an indication of software violation by means of encrypting the beacon signal using an internal state of the computer as part of an encryption keys;
    wherein the beacon signal provides to the one or more other computers an indication of the alert level of the computer and an indication of whether the computer is a trusted or non-trusted member of the network; and determining an alert level for the one or more other computers based on the indication of the alert level and the indication of the trusted or non-trusted nature of the computer.

10. A tangible computer storage medium for storing computer readable code representing instructions for causing one or more computer processors to perform the method according to claim 9 when the instructions are executed by the one or more computer processors.

11. A computer for operation within a network of computers, comprising:
    means for receiving a beacon signal from one other computer in the network, said beacon signal identifying said other computer and comprising an indication of a software which has been running on the other computer; and
    means for comparing the indication against a record of acceptable software so as to identify non-acceptable software use on the other computer, and if non-acceptable software use is identified then raising an alert level of the computer;
    wherein the indication of the software comprises the beacon signal having been encrypted using an internal state of the other computer as part of an encryption key;
    wherein the beacon signal provides to the computer an indication of the alert level of the other computer and an indication of whether the other computer is a trusted or non-trusted member of the network; and the computer further comprises means for determining an alert level for the computer based on the indication of the alert level and the indication of the trusted or non-trusted nature of the other computer.

12. The computer according to claim 11, in which the indication of the software comprises a log file comprising a plurality of entries, wherein each identifying software entries use on the other computer.

13. The computer according to claim 11, in which the indication of the software comprises a series of data flags, wherein each data flags representing software use on the other computer.

14. The computer according to claim 11, further comprising: means for transmitting a signal to one or more additional computers, said signal comprising an indication of the alert level of the computer.

15. The computer according to claim 11, in which the record of acceptable software comprises a set of mandatory software applications, and the means for comparing is arranged to identify non-acceptable software use when the means for comparing determines that an element of the set of mandatory software has not been run on the computer.

16. The computer according to claim 11, in which the record of acceptable software comprises a set of prohibited software applications, and the means for comparing is arranged to identify non-acceptable software use when the step of comparing determines that an element of the set of prohibited software has been run on the computer.

17. The computer according to claim 11, in which the indication of whether the other computer is a trusted or non-trusted member of the network comprises the indication of the software which has been run on the other computer.

18. A computer for operating in a network of computers, comprising:

means for monitoring the software run on the computer over a predetermined period;

means for comparing the software run during the predetermined period against a record of acceptable software so as to identify non-acceptable software use on the computer; and means for transmitting a beacon signal to one or more other computers, said beacon signal identifying the computer, and if non-acceptable software use has been identified then including in the beacon signal an indication of software violation by means of encrypting the beacon signal using an internal state of the computer as part of an encryption key;

wherein the beacon signal provides to the one or more other computers an indication of the alert level of the computer and an indication of whether the computer is a trusted or non-trusted member of the network; and determining an alert level for the one or more other computers based on the indication of the alert level and the indication of the trusted or non-trusted nature of the computer.

\* \* \* \* \*